(12) United States Patent
Benkreira et al.

(10) Patent No.: US 12,218,933 B2
(45) Date of Patent: Feb. 4, 2025

(54) VERIFICATION BASED ON AN ENCRYPTED REPRESENTATION OF A PHYSICAL IDENTIFIER ASSOCIATED WITH A USER

(71) Applicant: Capital One Services, LLC, McLean, VA (US)

(72) Inventors: Abdelkader M'hamed Benkreira, Brooklyn, NY (US); Xiaoguang Zhu, New York, NY (US); Brendan Way, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 344 days.

(21) Appl. No.: 17/657,525

(22) Filed: Mar. 31, 2022

(65) Prior Publication Data
US 2023/0319031 A1 Oct. 5, 2023

(51) Int. Cl.
H04L 9/32 (2006.01)
G06F 21/32 (2013.01)
G06F 21/62 (2013.01)
H04L 9/40 (2022.01)

(52) U.S. Cl.
CPC .......... *H04L 63/0861* (2013.01); *G06F 21/32* (2013.01); *G06F 21/62* (2013.01); *H04L 9/3231* (2013.01); *H04L 63/0435* (2013.01); *H04L 63/0876* (2013.01); *G06F 2221/2115* (2013.01)

(58) Field of Classification Search
CPC .......... G06F 21/30; G06F 21/31; G06F 21/32; G06F 21/60; G06F 21/62; G06F 2221/2115; H04L 9/32; H04L 9/3226; H04L 9/3231; H04L 63/04; H04L 63/0428; H04L 63/0435; H04L 63/08; H04L 63/0876
See application file for complete search history.

(56) References Cited

U.S. PATENT DOCUMENTS

| 7,543,736 B2 | 6/2009 | Swift et al. |
| 8,463,431 B2 | 6/2013 | Segal et al. |
| 9,288,056 B1* | 3/2016 | Spagnola ............ H04L 63/0876 |
| 10,157,275 B1* | 12/2018 | Venkatasamy ...... H04L 63/0428 |
| 11,120,413 B2 | 9/2021 | Liberty et al. |

(Continued)

FOREIGN PATENT DOCUMENTS

CN 107077669 A 8/2017

OTHER PUBLICATIONS

Extended European Search Report for Application No. EP23164553.2, mailed on Aug. 7, 2023, 12 Pages.

*Primary Examiner* — D'Arcy Winston Straub
(74) *Attorney, Agent, or Firm* — Harrity & Harrity, LLP

(57) ABSTRACT

In some implementations, a server may receive, from a first user device, a request to use an encrypted representation of a digital representation of a physical identifier (ID) associated with the user. Accordingly, the server may transmit, to a second user device, a prompt associated with validation of the request, and may receive, from the second user device, a response to the prompt. The server may validate the request using the response to the prompt. The server may transmit, to a first remote server, at least a first portion of the encrypted representation with a request to perform a first action associated with the user. The server may additionally transmit, to a second remote server, at least a second portion of the encrypted representation with a request to perform a second action associated with the user.

20 Claims, 12 Drawing Sheets

(56) References Cited

U.S. PATENT DOCUMENTS

| | | | |
|---|---|---|---|
| 2015/0063655 A1* | 3/2015 | Poder | G06T 1/0071 |
| | | | 382/116 |
| 2017/0169422 A1 | 6/2017 | Ye et al. | |
| 2019/0182042 A1 | 6/2019 | Ebrahimi et al. | |
| 2019/0370737 A1 | 12/2019 | Grabovski et al. | |
| 2020/0127826 A1 | 4/2020 | Ebrahimi et al. | |

* cited by examiner

VERIFICATION BASED ON AN ENCRYPTED REPRESENTATION OF A PHYSICAL IDENTIFIER ASSOCIATED WITH A USER

BACKGROUND

Generally, to authenticate and perform an action (e.g., user verification, a transaction, or trigger shipping), a user manually enters pieces of information. For example, a user may input the user's name, billing address, shipping address, account number, expiry date, security code, and/or other similar information to perform the action. To comply with encryption standards, the pieces of information are often encrypted separately.

SUMMARY

Some implementations described herein relate to a system for verification based on a physical identifier (ID) associated with a user. The system may include one or more memories and one or more processors communicatively coupled to the one or more memories. The one or more processors may be configured to receive a digital representation of the physical ID associated with the user. The one or more processors may be further configured to generate an encrypted representation of the digital representation. The one or more processors may be configured to receive, from a user device, a request to use the encrypted representation. The one or more processors may be further configured to transmit, to the user device, a prompt associated with validation of the request. The one or more processors may be configured to receive, from the user device and based on the prompt, an image of the user. The one or more processors may be further configured to validate the request using the image of the user. The one or more processors may be configured to transmit, to a remote server, the encrypted representation with a request to perform an action associated with the user.

Some implementations described herein relate to a method of verification based on a physical ID associated with a user. The method may include receiving, from a first user device, a request to use an encrypted representation of a digital representation of the physical ID associated with the user. The method may further include transmitting, to a second user device, a prompt associated with validation of the request. The method may include receiving, from the second user device, a response to the prompt. The method may further include validating the request using the response to the prompt. The method may include transmitting, to a first remote server, at least a first portion of the encrypted representation with a request to perform a first action associated with the user. The method may further include transmitting, to a second remote server, at least a second portion of the encrypted representation with a request to perform a second action associated with the user.

Some implementations described herein relate to a non-transitory computer-readable medium that stores a set of instructions for verification based on a physical ID associated with a user for a device. The set of instructions, when executed by one or more processors of the device, may cause the device to receive, from a server, a request to perform an action associated with the user along with an encrypted representation of a digital representation of the physical ID associated with the user. The set of instructions, when executed by one or more processors of the device, may further cause the device to decrypt, using a private key, the encrypted representation to obtain the digital representation. The set of instructions, when executed by one or more processors of the device, may cause the device to map the digital representation to an account associated with the user. The set of instructions, when executed by one or more processors of the device, may further cause the device to update at least one property associated with the account based on the request to perform the action.

DETAILED DESCRIPTION

The following detailed description of example implementations refers to the accompanying drawings. The same reference numbers in different drawings may identify the same or similar elements.

To authenticate and perform an action (e.g., user verification, a transaction, or trigger shipping), a user generally enters multiple pieces of information, such as the user's name, billing address, shipping address, account number, expiry date, security code, and/or other similar information. To comply with encryption standards, the pieces of information are often encrypted separately. This results in consumption of processing resources and power, both at a device used by the user when encrypting the pieces of information and at a server that performs the action when decrypting the pieces of information.

Some implementations described herein provide for generating a token or other encrypted representation based on a physical identifier (ID) associated with a user. Accordingly, the user may use a selfie, a response to a query, and/or a biometric property to use the encrypted representation, which results in fewer encryptions performed at a user device. As a result, power and processing resources are conserved at the user device. Additionally, a server may perform an action based on receiving the encrypted representation from the user device, which results in fewer decryptions performed at the server. As a result, power and processing resources are conserved at the server.

Additionally, in some implementations, the user device may transmit different portions of the encrypted representation, based on the physical ID, to different servers. As a result, the user device may request multiple actions to be performed using the same encrypted representations, further conserving power and processing resources at the user device. Furthermore, because each server only receives a portion of the encrypted representation, security is improved because fewer devices have access to the whole of the encrypted representation.

FIGS. 1A-1D are diagrams of an example 100 associated with verification based on an encrypted representation of a physical ID. As shown in FIGS. 1A-1D, example 100 includes a user device, a middleman server, and a remote server. These devices are described in more detail in connection with FIGS. 5 and 6.

Figure 1A:
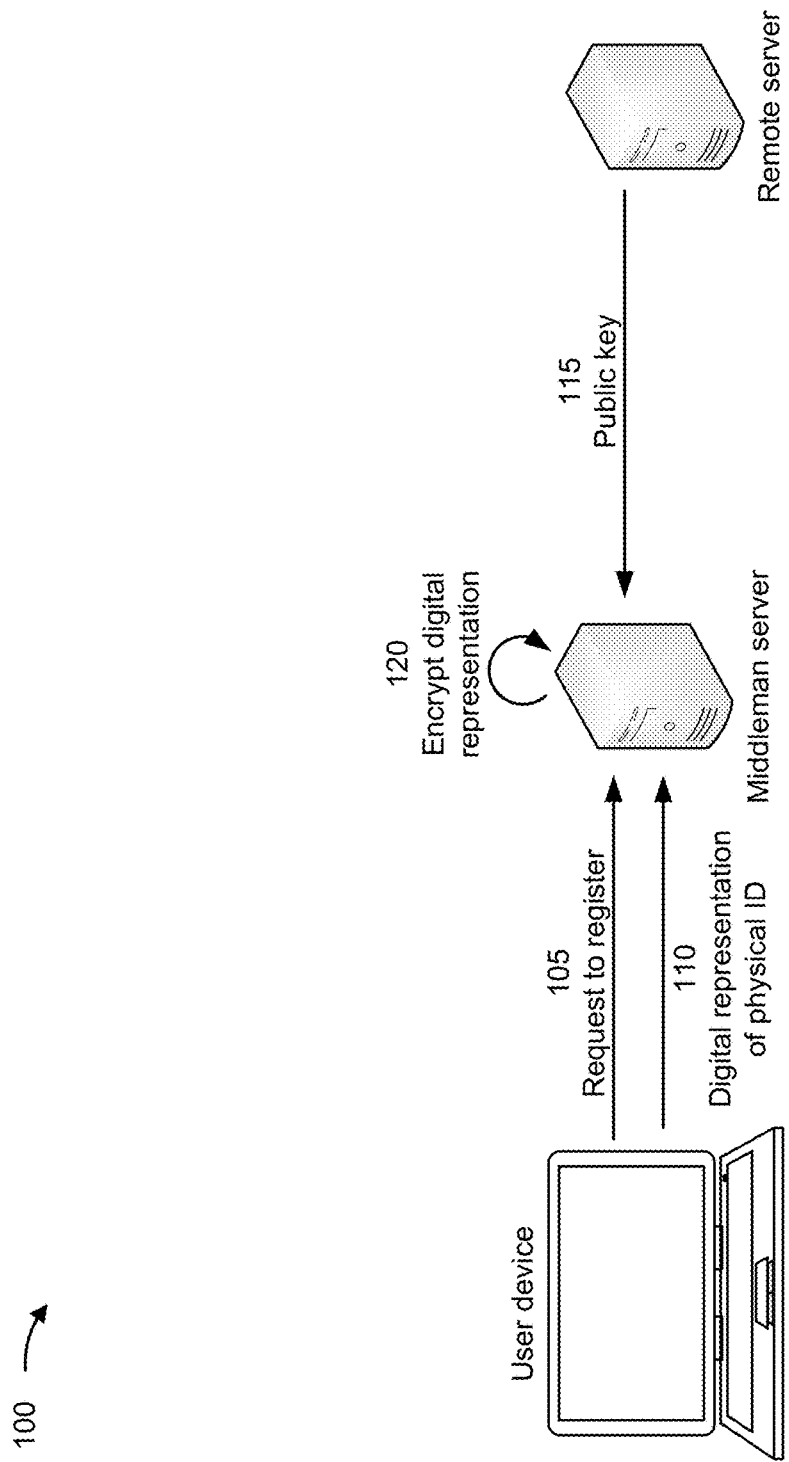
FIGS. 1A-1D are diagrams of an example implementation relating to verification based on an encrypted representation of a physical identifier.

As shown in FIG. 1A and by reference number 105, the user device may transmit, and the middleman server may receive, a request to register. For example, the user device may transmit a message and/or another type of data structure associated with a registration process to allow a user to use a physical ID for verification.

As shown by reference number 110, the user device may additionally transmit, and the middleman server may receive, a digital representation of the physical ID associated with the user. The digital representation may include an alphanumeric identifier unique to the physical ID associated with the user, an optical scan of a portion of the physical ID, and/or a digital image of the physical ID, among other examples. As used herein, a "physical ID" refers to a physical object associated with the user that expressly indicates an identity of the user (e.g., via an image, a name, and/or another representation of the user's identity) but does not expressly indicate a payment account associated with the user (e.g., a credit card number, a debit card number, a money market account number, and/or another representation of a financial account). The physical ID may be as described in connection with FIG. 4.

In some implementations, the digital representation may be included with the request. For example, the user device may insert the digital representation into the data structure that is the request. Alternatively, the digital representation may be transmitted separately from the request.

In some implementations, the user device may encrypt the digital representation before transmitting the digital representation to the middleman server. For example, the user device may apply a public key (e.g., provided by the middleman server) of a public-private (or other asymmetric) key pair to encrypt the digital representation. In another example, the user device may apply a key (e.g., provided by the middleman server) of a symmetric key pair to encrypt the digital representation.

As shown by reference number 115, the remote server may provide a key to the middleman server. As shown in FIG. 1A, the key may be a public key of a public-private (or other asymmetric) key pair. Alternatively, the key may be from a symmetric key pair.

Accordingly, as shown by reference number 120, the middleman server may generate an encrypted representation of the digital representation. For example, the middleman server may apply the public key (e.g., provided by the remote server) to encrypt the digital representation. In another example, the middleman server may apply the key from a symmetric key pair to encrypt the digital representation.

In some implementations, the middleman server may decrypt the encrypted digital representation received from the user device (e.g., as described above) and re-encrypt the decrypted digital representation using a different key (e.g., provided by the remote server). Alternatively, the user device may use the key provided by the remote server such that the middleman server may forward the encrypted digital representation without any intervening decryption.

Figure 1B:
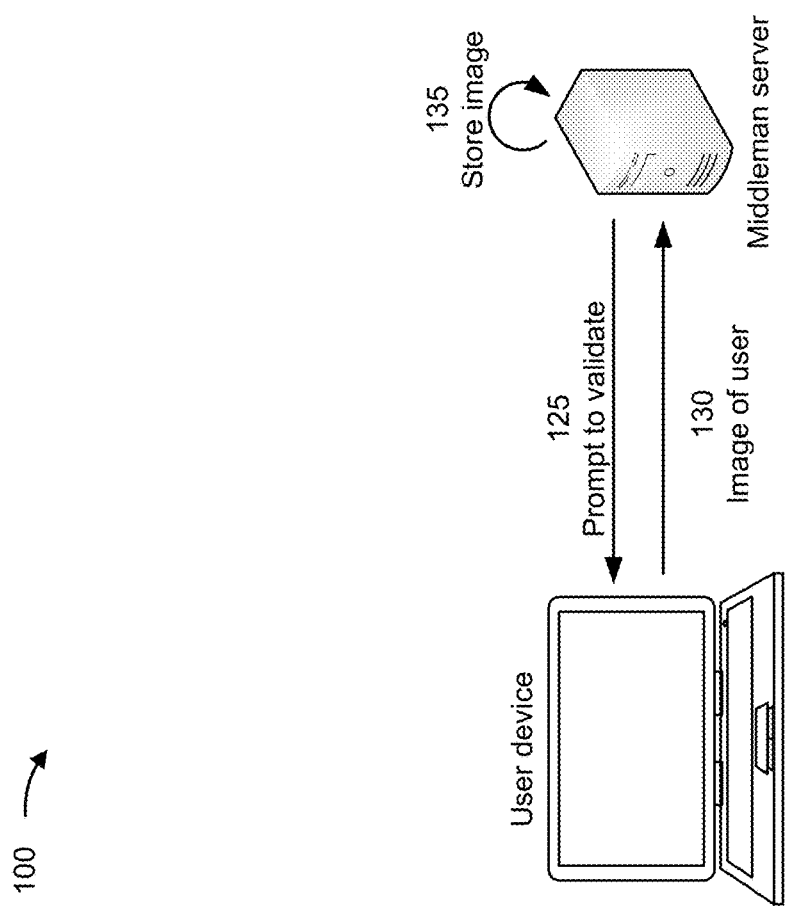

As shown in FIG. 1B and by reference number 125, the middleman server may transmit, and the user device may receive, a prompt associated with validation of the request. For example, the prompt may include a message and/or another type of data structure associated with the registration process. In some implementations, the prompt includes a prompt for the user to allow a camera, associated with the user device, to capture the image of the user. Accordingly, and as shown by reference number 130, the user device may transmit, and the middleman server may receive, an image of the user. In some implementations, the user device may encrypt the image before transmitting the image to the middleman server. For example, the user device may apply a public key (e.g., provided by the middleman server) of a public-private (or other asymmetric) key pair to encrypt the image. In another example, the user device may apply a key (e.g., provided by the middleman server) of a symmetric key pair to encrypt the image.

The middleman server may therefore store the image, as shown by reference number 135. The middleman server may store the image in association with the encrypted representation of the digital representation of the physical ID associated with the user. For example, the middleman server may use a database and/or another similar type of data structure to associate the stored image with the stored encrypted representation.

In some implementations, the middleman server may decrypt the encrypted image received from the user device (e.g., as described above) and re-encrypt the decrypted image for storage using a different key. Alternatively, the user device may use a key provided by the middleman server such that the middleman server may store the encrypted image without any intervening decryption.

In some implementations, the middleman server may additionally forward the request from the user device to the remote server. For example, the middleman server may forward the data structure that is the request, insert the data structure that is the request into a message to the remote server, or extract information included in the request from the user device and insert the extracted information into the message to the remote server. In some implementations, the middleman server may include the encrypted representation and an indication of an account associated with the user. Accordingly, the remote server may store the encrypted representation in association with the indication of the account associated with the user. For example, the remote server may use a database and/or another similar type of data structure to associate the stored indication of the account with the stored encrypted representation.

Although described in connection with an image of the user, other implementations may use a biometric property associated with the user. For example, the middleman server may transmit a prompt for the user to allow an optical sensor, associated with the user device, to capture a fingerprint, an eye scan, a facial scan, and/or another biometric property associated with the user.

Figure 1C:
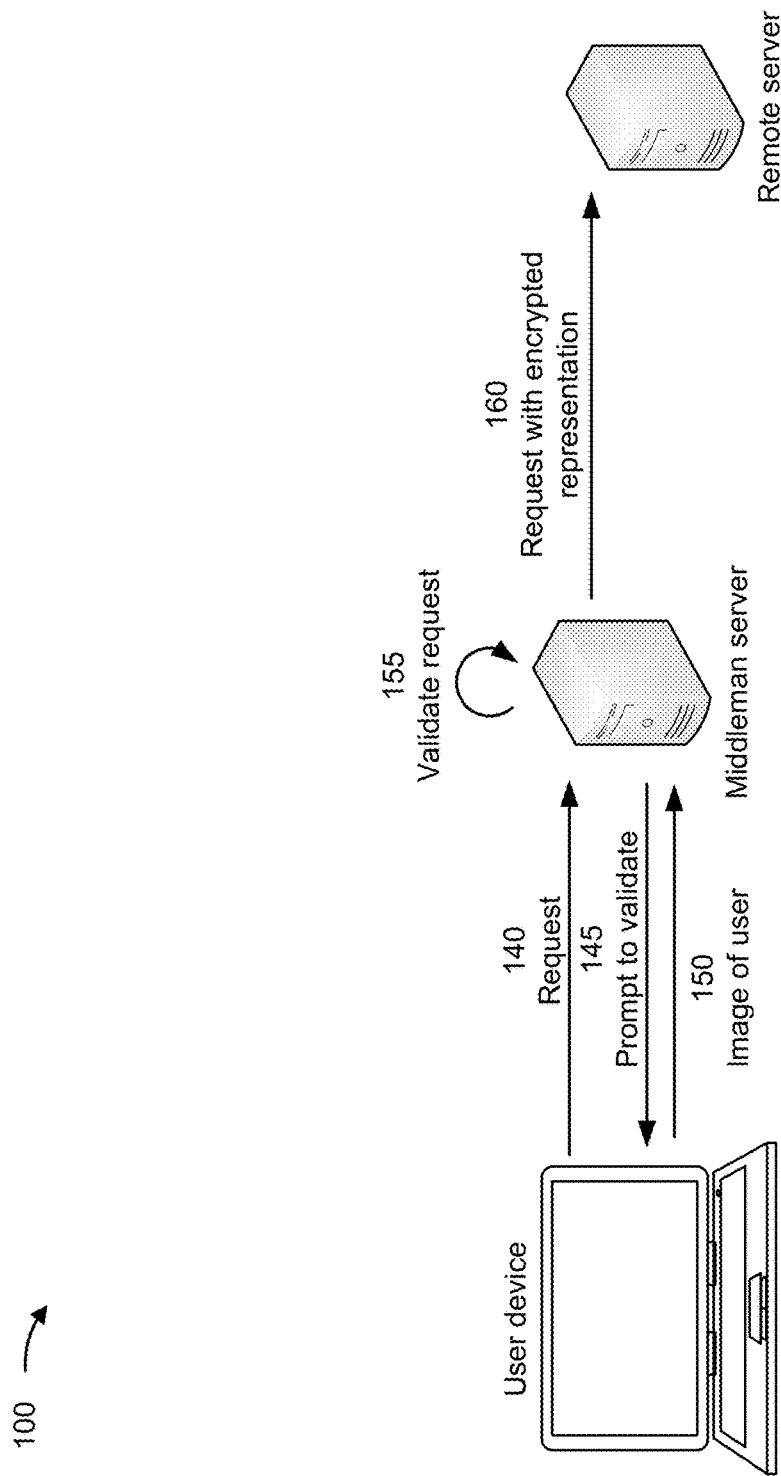

As shown in FIG. 1C and by reference number 140, the user device may transmit, and the middleman server may receive, a request to use the encrypted representation of the digital representation of the physical ID associated with the user. For example, the user device may transmit a message and/or another type of data structure associated with a verification process associated with use of a physical ID. In one example, the user may navigate to a website, using the user device, and initiate the request to the middleman server by interacting with the website. In another example, the user may interact with an application, executed on the user device, to initiate the request to the middleman server.

Accordingly, as shown by reference number 145, the middleman server may transmit, and the user device may receive, a prompt associated with validation of the request. For example, the middleman server may transmit a message and/or another type of data structure associated with the verification process. In some implementations, the prompt includes a prompt for the user to allow a camera, associated with the user device, to capture an image of the user. Accordingly, and as shown by reference number 150, the user device may transmit, and the middleman server may receive, an image of the user. In some implementations, the user device may encrypt the image before transmitting the image to the middleman server. For example, the user device may apply a public key (e.g., provided by the middleman server) of a public-private (or other asymmetric) key pair to encrypt the image. In another example, the user device may apply a key (e.g., provided by the middleman server) of a symmetric key pair to encrypt the image.

The middleman server may therefore validate the request based on the image, as shown by reference number 155. For example, the middleman server may compute a similarity score between the image of the user and the stored image (e.g., as described in connection with reference number 135) associated with the encrypted representation, and may validate the request based on the similarity score satisfying a threshold. In some implementations, the middleman server may calculate the similarity score based on features (e.g., one or more features) extracted from the received image and the stored image by an image analysis model (e.g., a regression model, a convolutional neural network (CNN), and/or another type of model that generates feature vectors based on images). Accordingly, the similarity score may include a (weighted) sum of differences between the features associated with the received image and the features associated with the stored image, an output from a pooling layer associated with the model, and/or another calculation that compares the features associated with the received image with the features associated with the stored image.

In some implementations, the middleman server may decrypt the encrypted image received from the user device (e.g., as described above) and decrypt the stored image for comparison. Alternatively, the user device may use a key provided by the middleman server such that the middleman server may compare the encrypted image received from the user device with the encrypted stored image.

Although described in connection with an image of the user, other implementations may use a biometric property associated with the user. For example, the middleman server may transmit a prompt for the user to allow an optical sensor, associated with the user device, to capture a fingerprint, an eye scan, a facial scan, and/or another biometric property associated with the user. Accordingly, the middleman server may compute a similarity score between the biometric property of the user and the stored biometric property associated with the encrypted representation and may validate the request based on the similarity score satisfying a threshold.

Accordingly, as shown by reference number 160, the middleman server may transmit, to a remote server, the encrypted representation with a request to perform an action associated with the user. For example, the request may include a message and/or another type of data structure associated with the action.

In some implementations, the middleman server may determine the remote server based on the request to use the encrypted representation. For example, the encrypted representation may be associated with an account associated with the user (e.g., as described above), such that the middleman server may determine an Internet protocol (IP) address, an application programming interface (API) call, and/or another identifier associated with the remote server based on the account associated with the encrypted representation. For example, the middleman server may use a database (or another similar data structure) to map the encrypted representation to the identifier associated with the remote server (either directly or indirectly via the account associated with the encrypted representation).

In some implementations, the request may additionally include a validation of the encrypted representation. For example, the middleman server may transmit a certificate, a key, and/or another indication that the middleman server has validated the user (e.g., using an image and/or a biometric property, as described in connection with reference number 155). The middleman server may include the validation in the request or may transmit the validation separately from the request.

Figure 1D:
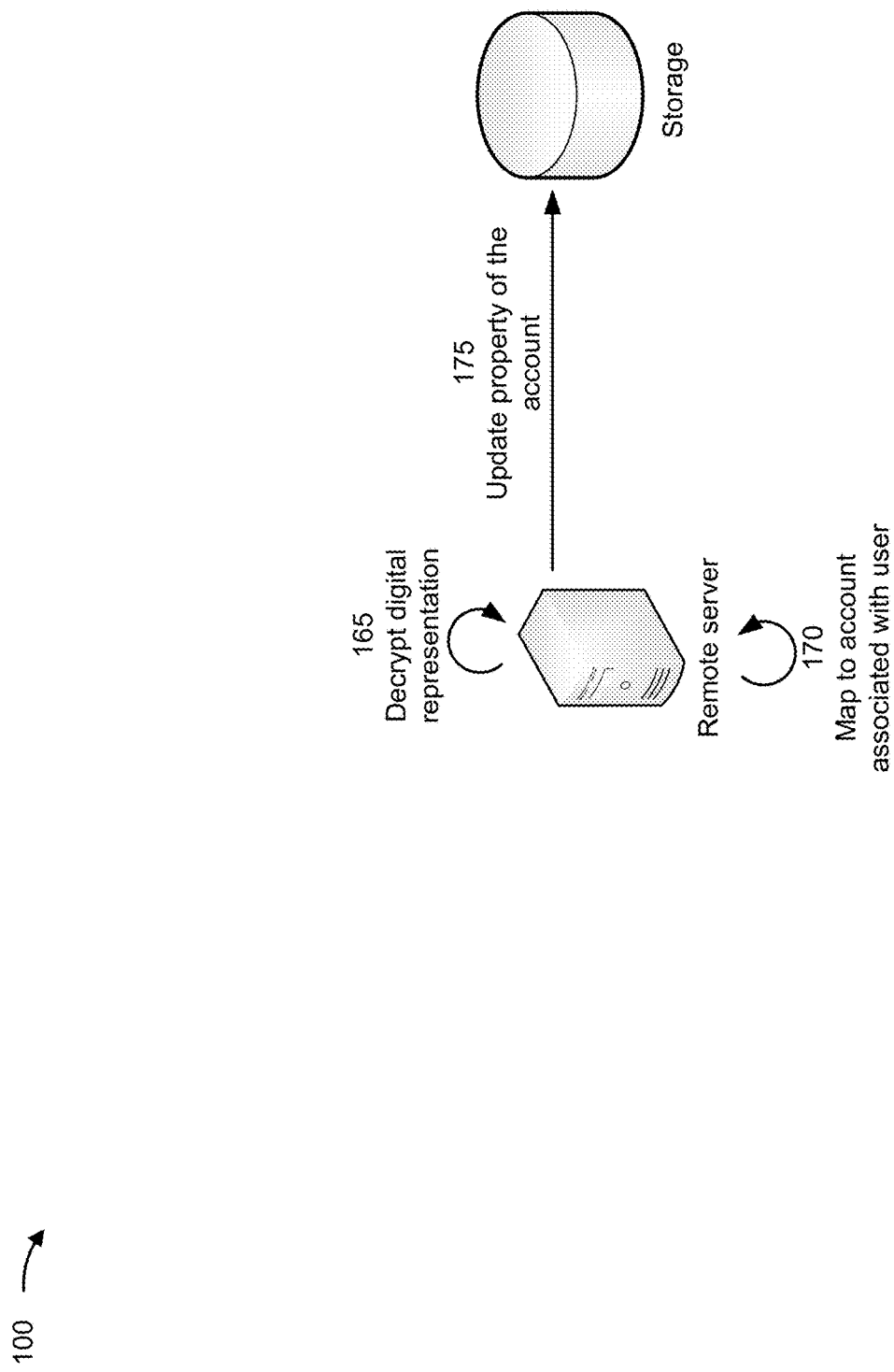

Accordingly, as shown in FIG. 1D and by reference number 165, the remote server may decrypt, using a private key, the encrypted representation to obtain the digital representation. For example, the middleman server may have encrypted the digital representation using a public key from the remote server (e.g., as described in connection with reference number 115). Accordingly, the remote server may map the digital representation to the account associated with the user, as shown by reference number 170. For example, the remote server may use a database (or another similar data structure) that links the account to the digital representation (e.g., as described above).

In some implementations, the digital representation may be associated with a plurality of accounts. For example, during the registration procedure, the user device may indicate multiple accounts to associate with the digital representation of the physical ID. Accordingly, the remote server may apply a rule (e.g., one or more rules) to select the account from the plurality of accounts. For example, the rule may include a default rule (e.g., selecting the account, from the plurality of accounts, that was received first or otherwise associated with a highest position in a message indicating the plurality of accounts). Alternatively, the rule may be indicated by the user device. For example, the user device may indicate (e.g., with the request during the registration procedure, as described in connection with reference number 105) an order of priority for the plurality of accounts and/or different categories associated with different accounts such that the remote server may select the account based on a category associated with the action. For example, the user device may indicate that one account is associated with food transactions and another account is associated with entertainment transactions. When the remote server cannot determine the category associated with the action, the remote server may select a default account (e.g., indicated by the user device or based on a default rule, as described above).

Therefore, as shown by reference number 175, the remote server may update a property (e.g., at least one property) associated with the account based on the request to perform the action. For example, the remote server may update a balance associated with the account (e.g., by performing a transaction using the account) based on the request to perform the action.

In some implementations, the remote server may modify a stored data structure, associated with the account, to update the property based on the request to perform the action. For example, the remote server may modify a stored indicator of a balance associated with the account (e.g., by performing a transaction using the account) based on the request to perform the action. Additionally, or alternatively, the remote server may store a new object within the data structure to indicate the action (e.g., an approved transaction using the account).

By using techniques as described in connection with FIGS. 1A-1D, the middleman server uses an image and/or a biometric property to validate a request to use the encrypted representation, which results in fewer encryptions performed at the user device and fewer decryptions performed at the middleman server. As a result, power and processing resources are conserved at the user device. Additionally, the remote server performs an action based on the encrypted representation, which results in fewer decryptions performed at the remote server. As a result, power and processing resources are conserved at the remote server.

As indicated above, FIGS. 1A-1D are provided as an example. Other examples may differ from what is described with regard to FIGS. 1A-1D.

Figure 2A:
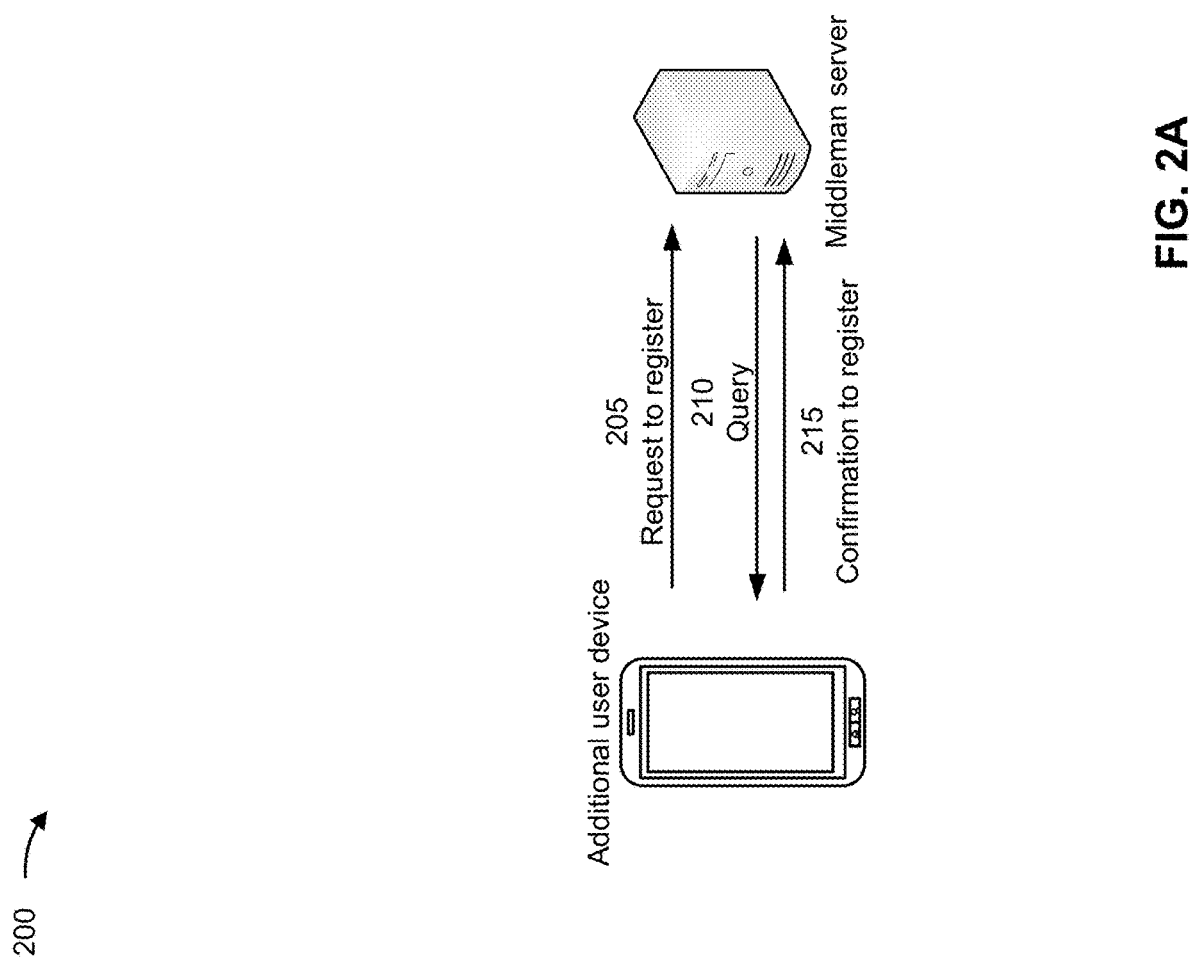
FIGS. 2A-2B are diagrams of an example implementation relating to registration of a user device for verification based on an encrypted representation of a physical identifier.
Figure 2B:
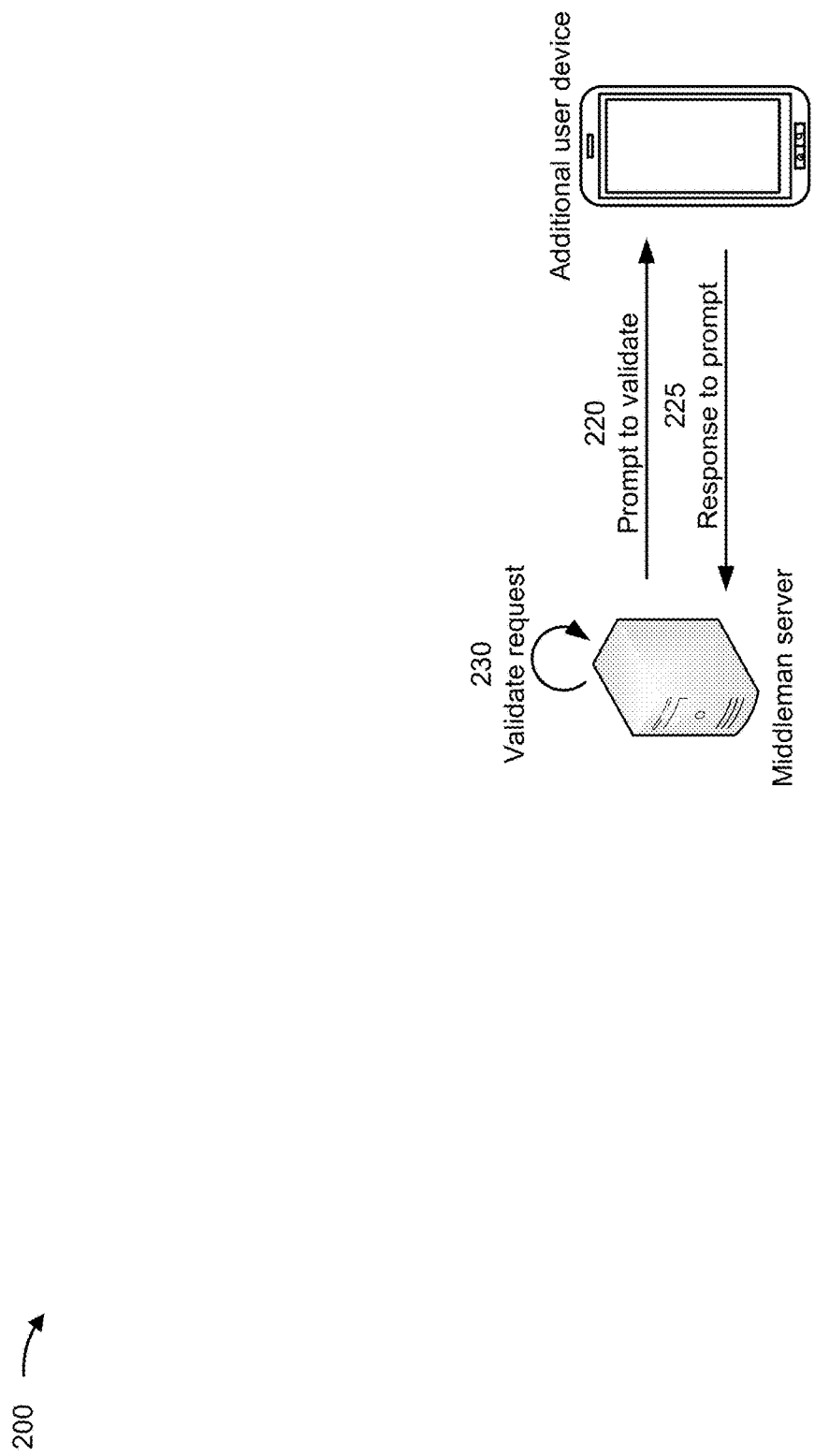

FIGS. 2A-2B are diagrams of an example 200 associated with registration of a user device for verification based on an encrypted representation of a physical ID. As shown in FIGS. 2A-2B, example 200 includes a user device and a middleman server. These devices are described in more detail in connection with FIGS. 5 and 6.

Example 200 includes a process for using an additional user device to validate a request in addition to, or in lieu of, an image and/or a biometric property, as described in example 100 of FIGS. 1A-1D. Accordingly, processes described in connection with example 200 may be combined with processes described in connection with example 100.

As shown in FIG. 2A and by reference number 205, the additional user device may transmit, and the middleman server may receive, a request to register the additional user device. For example, the request may include a message and/or another type of data structure associated with a registration process to allow a user to use a physical ID for verification, as described in connection with reference number 105 of FIG. 1A.

In some implementations, the user may initiate the request on the additional user device based on instructions provided, by the middleman server, to the user device depicted in FIGS. 1A-1D. Alternatively, the middleman server may prompt the additional user device to initiate the request based on an initial request from the user device depicted in FIGS. 1A-1D.

Accordingly, as shown by reference number 210, the middleman server may transmit, and the additional user device may receive, a query associated with registration of the additional user device. For example, the query may include a push notification and/or another type of message asking the additional user device to confirm registration.

Therefore, as shown by reference number 215, the additional user device may transmit, and the middleman server may receive, a confirmation. For example, the confirmation may include a message and/or another type of data structure associated with the registration process to allow the user to use the physical ID for verification, as described in connection with reference number 105 of FIG. 1A. In some implementations, the confirmation may include a key, a certificate, an IP address, a medium access control (MAC) address, and/or another identifier associated with the additional user device such that the middleman server is authorized to contact the additional user device. For example, the additional user device may execute an application that responds to requests from the middleman server when the requests include the identifier associated with the additional user device.

Therefore, when the middleman server is processing a request to use an encrypted representation of a digital representation of the physical ID (e.g., as described in connection with FIGS. 1C-1D), the middleman server may transmit, and the additional user device may receive, a prompt associated with validation of the request, as shown in FIG. 2B and by reference number 220. For example, the middleman server may transmit a message and/or another type of data structure associated with a verification process associated with use of a physical ID, as described in connection with FIGS. 1C-1D. In some implementations, the prompt may include a push notification to the additional user device.

Accordingly, as shown by reference number 225, the additional user device may transmit, and the middleman server may receive, a response to the prompt. For example, the response may include an indication that the user has approved the request, an indication of a secret code or other alphanumeric sequence (e.g., configured during registration of the additional user device, as described in connection with FIG. 2A), and/or an answer to a verification question (e.g., configured during registration of the additional user device, as described in connection with FIG. 2A). Accordingly, the additional user device may transmit a secure message that responds to the prompt and validates the request.

By using techniques as described in connection with FIGS. 2A-2B, the request to use the encrypted representation of the digital representation of the physical ID may be verified using the additional user device in addition to, or in lieu of, an image and/or a biometric property. Accordingly, security is improved by using two-factor authorization.

As indicated above, FIGS. 2A-2B are provided as an example. Other examples may differ from what is described with regard to FIGS. 2A-2B.

Figure 3A:
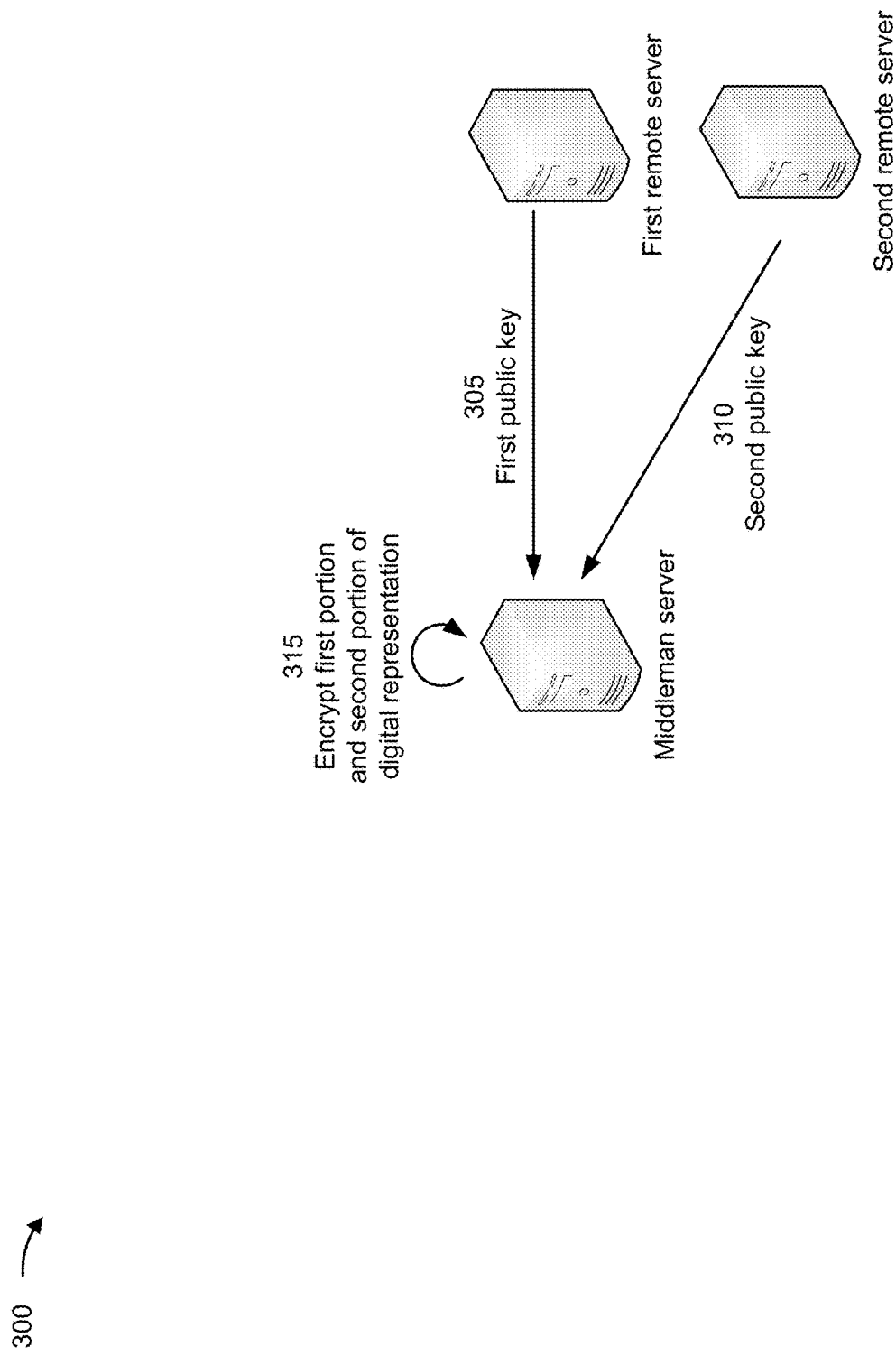
FIGS. 3A-3B are diagrams of an example implementation relating to contacting different remote servers based on different portions of an encrypted representation of a physical identifier.
Figure 3B:
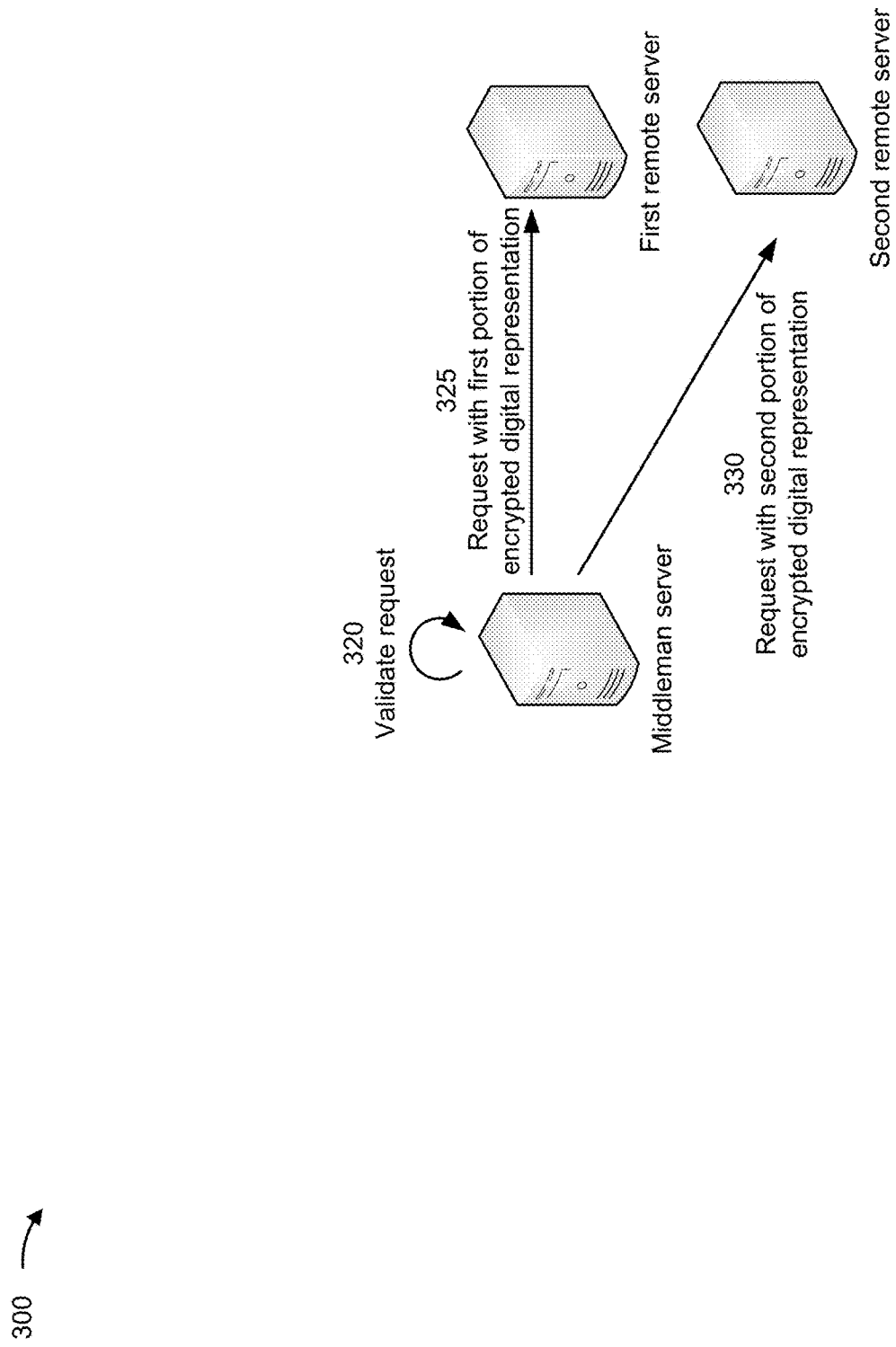

FIGS. 3A-3B are diagrams of an example 300 associated with contacting different remote servers based on different portions of an encrypted representation of a physical ID. As shown in FIGS. 3A-3B, example 100 includes a middleman server, a first remote server, and a second remote server. These devices are described in more detail in connection with FIGS. 5 and 6.

As described with respect to example 100, the middleman server may encrypt a digital representation of a physical ID and transmit the encrypted representation to a remote server. However, in some implementations, different remote servers may need to perform different actions for a user. Accordingly, the middleman server may transmit the encrypted representation to multiple remote servers (e.g., the first remote server and the second remote server in example 200).

As shown in FIG. 3A and by reference number 305, the first remote server may provide a first key to the middleman server. As shown in FIG. 3A, the first key may be a public key of a public-private (or other asymmetric) key pair. Alternatively, the first key may be from a symmetric key pair.

Similarly, as shown by reference number 310, the second remote server may provide a second key to the middleman server. As shown in FIG. 3A, the second key may be a public key of a public-private (or other asymmetric) key pair. Alternatively, the second key may be from a symmetric key pair.

Accordingly, as shown by reference number 315, the middleman server may generate an encrypted representation of the digital representation of the physical ID associated with the user. For example, the middleman server may apply the first key to generate a first portion of the encrypted representation of the digital representation of the physical ID associated with the user. Similarly, the middleman server may apply the second key to generate a second portion of the encrypted representation of the digital representation of the physical ID associated with the user.

In one example, the first portion of the encrypted representation is associated with an identifier of the user. For example, the middleman server may apply optical character recognition (OCR), a visual classifier, and/or another model to the digital representation of the physical ID in order to determine the first portion of the digital representation that includes a name, an identifying number, and/or another identifier of the user. Additionally, the second portion of the encrypted representation may be associated with the address of the user. Accordingly, the middleman server may similarly apply OCR, a visual classifier, and/or another model to the digital representation of the physical ID in order to determine the second portion of the digital representation that includes the address.

Therefore, when the middleman server is processing a request to use the encrypted representation of the digital representation of the physical ID (e.g., as described in connection with FIGS. 1C-1D), the middleman server may validate the request, as shown in FIG. 3B and by reference number 320. For example, the middleman server may validate the request as described in connection with reference number 155 of FIG. 1C and/or reference number 230 of FIG. 2B.

Accordingly, as shown by reference number 325, the middleman server may transmit, to the first remote server, the first portion of the encrypted representation with a request to perform a first action associated with the user. For example, the request may include a message and/or another type of data structure associated with the first action. In some implementations, the first remote server is associated with an account of the user, and the first remote server may perform the action as described in connection with FIG. 1D.

Additionally, as shown by reference number 330, the middleman server may transmit, to the second remote server, the second portion of the encrypted representation with a request to perform a second action associated with the user. For example, the request may include a message and/or another type of data structure associated with the second action. In some implementations, the second remote server is associated with an address of the user, and the second remote server may generate a digital and/or physical shipping slip in order to perform the second action.

By using techniques as described in connection with FIGS. 3A-3B, the middleman server transmits different portions of the encrypted representation, based on the physical ID, to different remote servers. As a result, the middleman server (as well as the user device) further conserves power and processing resources that would otherwise be used for additional encryption and decryption. Furthermore, because each remote server only receives a portion of the encrypted representation, security is improved because fewer devices have access to the whole of the encrypted representation.

As indicated above, FIGS. 3A-3B are provided as an example. Other examples may differ from what is described with regard to FIGS. 3A-3B.

Figure 4:
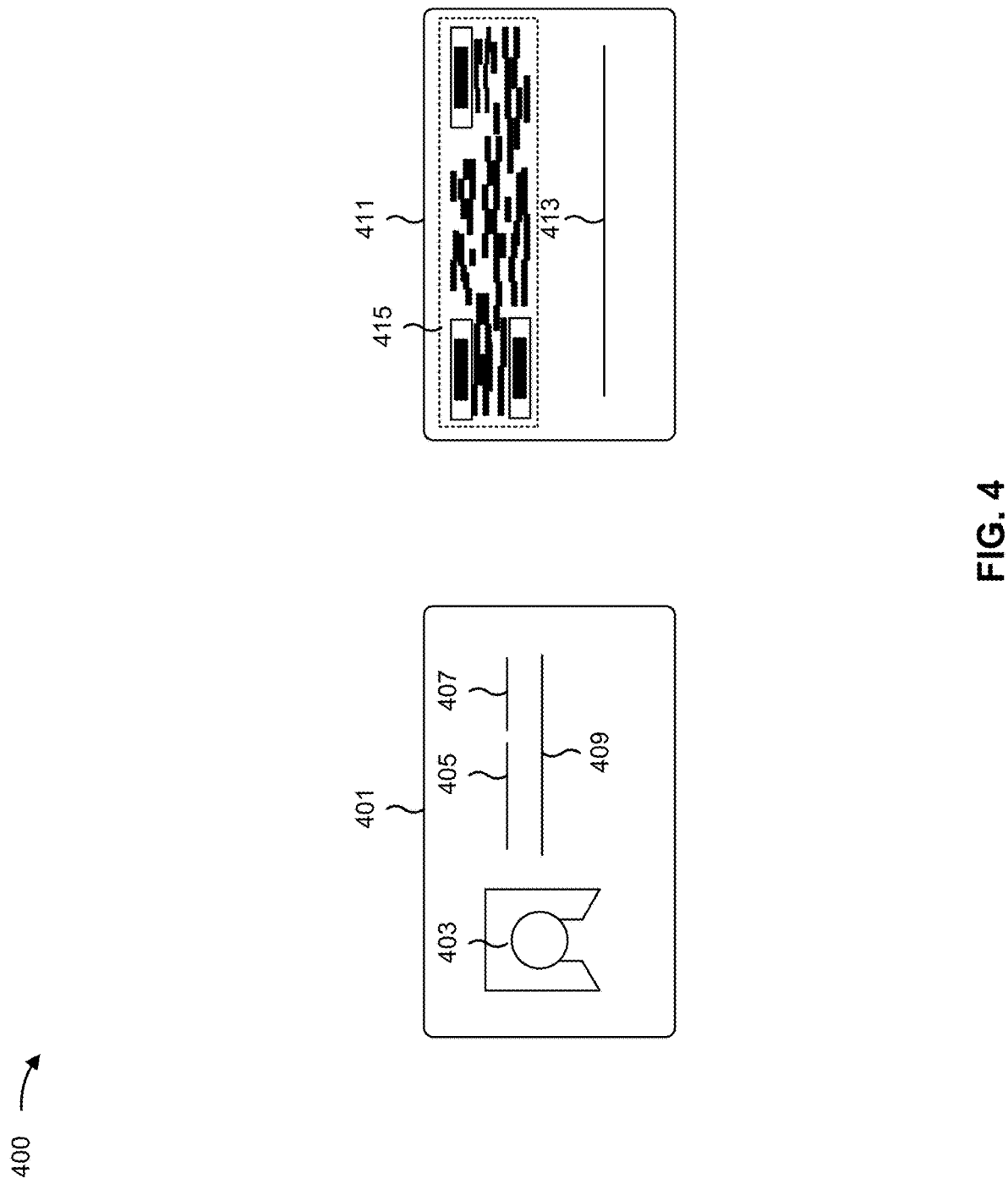
FIG. 4 is a diagram of an example physical identifier (ID) associated with a user.

FIG. 4 is a diagram of an example physical ID 400 that systems and/or methods described herein may use. As shown in FIG. 4, the physical ID 400 includes a first side 401. The first side 401 may expressly indicate an identity of a user associated with the physical ID 400. For example, the first side 401 includes an image 403 of the user and a name 405 of the user. Furthermore, the first side 401 may include a date of birth (DOB) 407 of the user. In some implementations, the first side 401 may also expressly indicate an address 409 associated with the user. Accordingly, information may be extracted from an image of the first side 401 using OCR and/or another model.

Additionally, or alternatively, the physical ID 400 includes a second side 411. The second side 411 may expressly indicate information 413 associated with the user (e.g., whether the user needs corrective lenses and/or whether the user is within a particular age range, among other examples). Additionally, the second side 411 may include a barcode 415 (and/or another similar machine-readable representation) that, when decoded, indicates a name, a DOB, an address, and/or another type of information associated with the user.

As indicated above, FIG. 4 is provided as an example. Other examples may differ from what is described with regard to FIG. 4.

Figure 5:
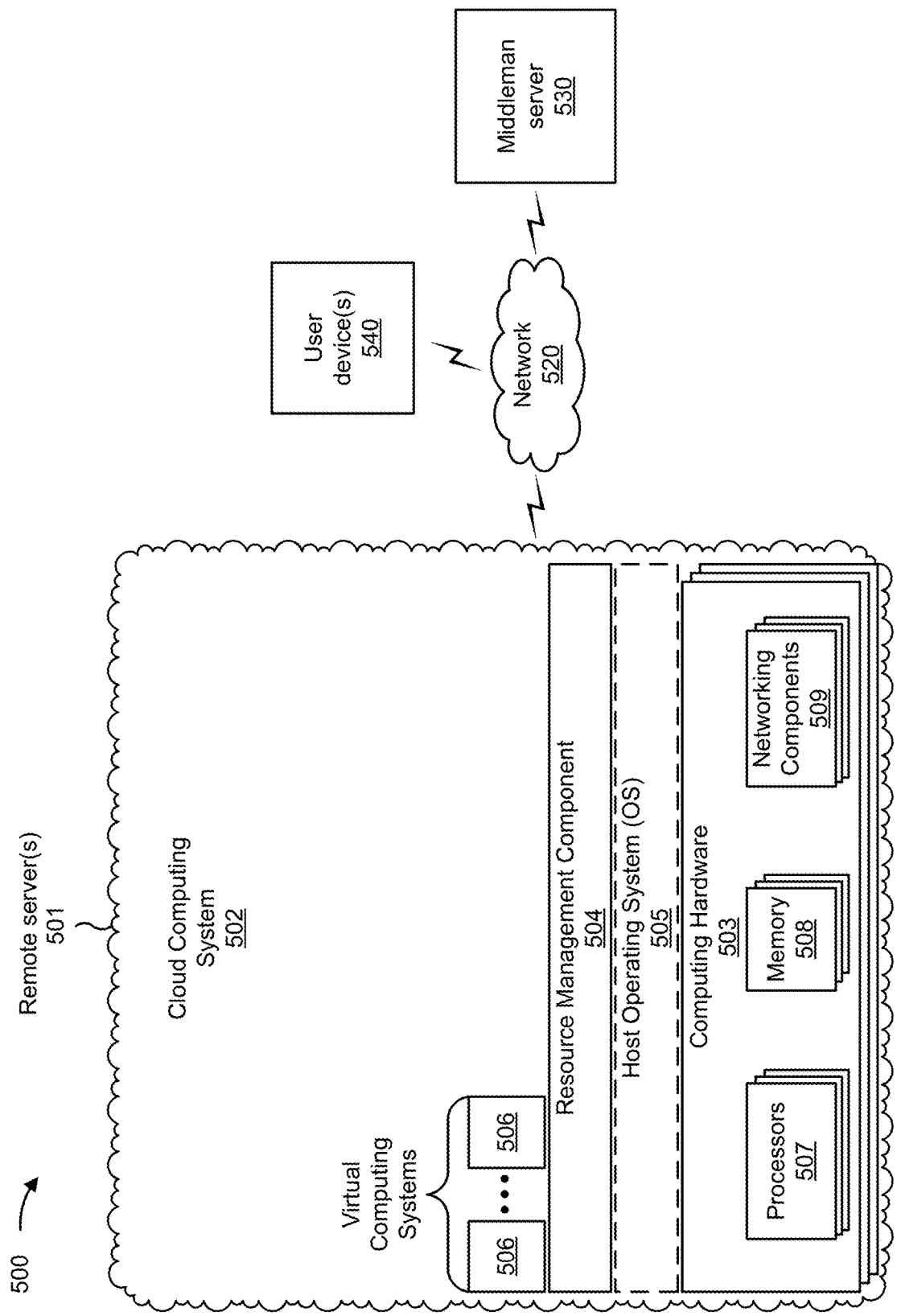
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include one or more remote servers 501, which may include one or more elements of and/or may execute within a cloud computing system 502. The cloud computing system 502 may include one or more elements 503-509, as described in more detail below. As further shown in FIG. 5, environment 500 may include a network 520, a middleman server 530 and/or one or more user devices 540. Devices and/or elements of environment 500 may interconnect via wired connections and/or wireless connections.

The cloud computing system 502 includes computing hardware 503, a resource management component 504, a host operating system (OS) 505, and/or one or more virtual computing systems 506. The cloud computing system 502 may execute on, for example, an Amazon Web Services platform, a Microsoft Azure platform, or a Snowflake platform. The resource management component 504 may perform virtualization (e.g., abstraction) of computing hardware 503 to create the one or more virtual computing systems 506. Using virtualization, the resource management component 504 enables a single computing device (e.g., a computer or a server) to operate like multiple computing devices, such as by creating multiple isolated virtual computing systems 506 from computing hardware 503 of the single computing device. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server) or from multiple computing devices (e.g., multiple servers), such as multiple computing devices in one or more data centers. As shown, computing hardware 503 may include one or more processors 507, one or more memories 508, and/or one or more networking components 509. Examples of a processor, a memory, and a networking component (e.g., a communication component) are described elsewhere herein.

The resource management component 504 includes a virtualization application (e.g., executing on hardware, such as computing hardware 503) capable of virtualizing computing hardware 503 to start, stop, and/or manage one or more virtual computing systems 506. For example, the resource management component 504 may include a hypervisor (e.g., a bare-metal or Type 1 hypervisor, a hosted or Type 2 hypervisor, or another type of hypervisor) or a virtual machine monitor, such as when the virtual computing systems 506 are virtual machines. Additionally, or alternatively, the resource management component 504 may include a container manager, such as when the virtual computing systems 506 are containers. In some implementations, the resource management component 504 executes within and/or in coordination with a host operating system 505.

A virtual computing system 506 includes a virtual environment that enables cloud-based execution of operations and/or processes described herein using computing hardware 503. The virtual computing system 506 may include a virtual machine, a container, or a hybrid environment that includes a virtual machine and a container, among other examples. A virtual computing system 506 may execute one or more applications using a file system that includes binary files, software libraries, and/or other resources required to execute applications on a guest operating system (e.g., within the virtual computing system 506) or the host operating system 505.

Although the remote server(s) 501 may include one or more elements 503-509 of the cloud computing system 502, may execute within the cloud computing system 502, and/or may be hosted within the cloud computing system 502, in some implementations, the remote server(s) 501 may not be cloud-based (e.g., may be implemented outside of a cloud computing system) or may be partially cloud-based. For example, the remote server(s) 501 may include one or more devices that are not part of the cloud computing system 502, such as device 600 of FIG. 6, which may include a standalone server or another type of computing device. The remote server(s) 501 may perform one or more operations and/or processes described in more detail elsewhere herein.

Network 520 includes one or more wired and/or wireless networks. For example, network 520 may include a cellular network, a public land mobile network (PLMN), a local area network (LAN), a wide area network (WAN), a private network, the Internet, and/or a combination of these or other types of networks. The network 520 enables communication among the devices of environment 500.

The middleman server 530 includes one or more devices capable of facilitating an electronic transaction. The middleman server 530 may be associated with a financial institution (e.g., a bank, a lender, a credit card company, or a credit union) and/or may be associated with a transaction card association that authorizes a transaction and/or facilitates a transfer of funds. For example, the middleman server 530 may be associated with an issuing bank, an acquiring bank (or merchant bank) associated with the merchant, and/or a transaction card association (e.g., VISA® or MASTERCARD®) associated with a user. Based on receiving information from the user device(s) 540, one or more devices of the middleman server 530 may communicate to authorize a transaction and/or to transfer funds from an account associated with the user to an account of an entity (e.g., a merchant) associated with the user device(s) 540.

The user device(s) 540 include one or more devices capable of wireless and/or wired communication. Accordingly, the user device(s) 540 may include a communication device and/or a computing device. For example, the user device(s) 540 may include a wireless communication device, a mobile phone, a user equipment (UE), a tablet computer, a wearable communication device (e.g., a smart wristwatch, a pair of smart eyeglasses, a head mounted display, or a virtual reality headset), or a similar type of device. Additionally, or alternatively, the user device(s) 540 may be capable of communicating with the middleman server 530 and/or the remote server(s) 501 via the network 520, as described elsewhere herein.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
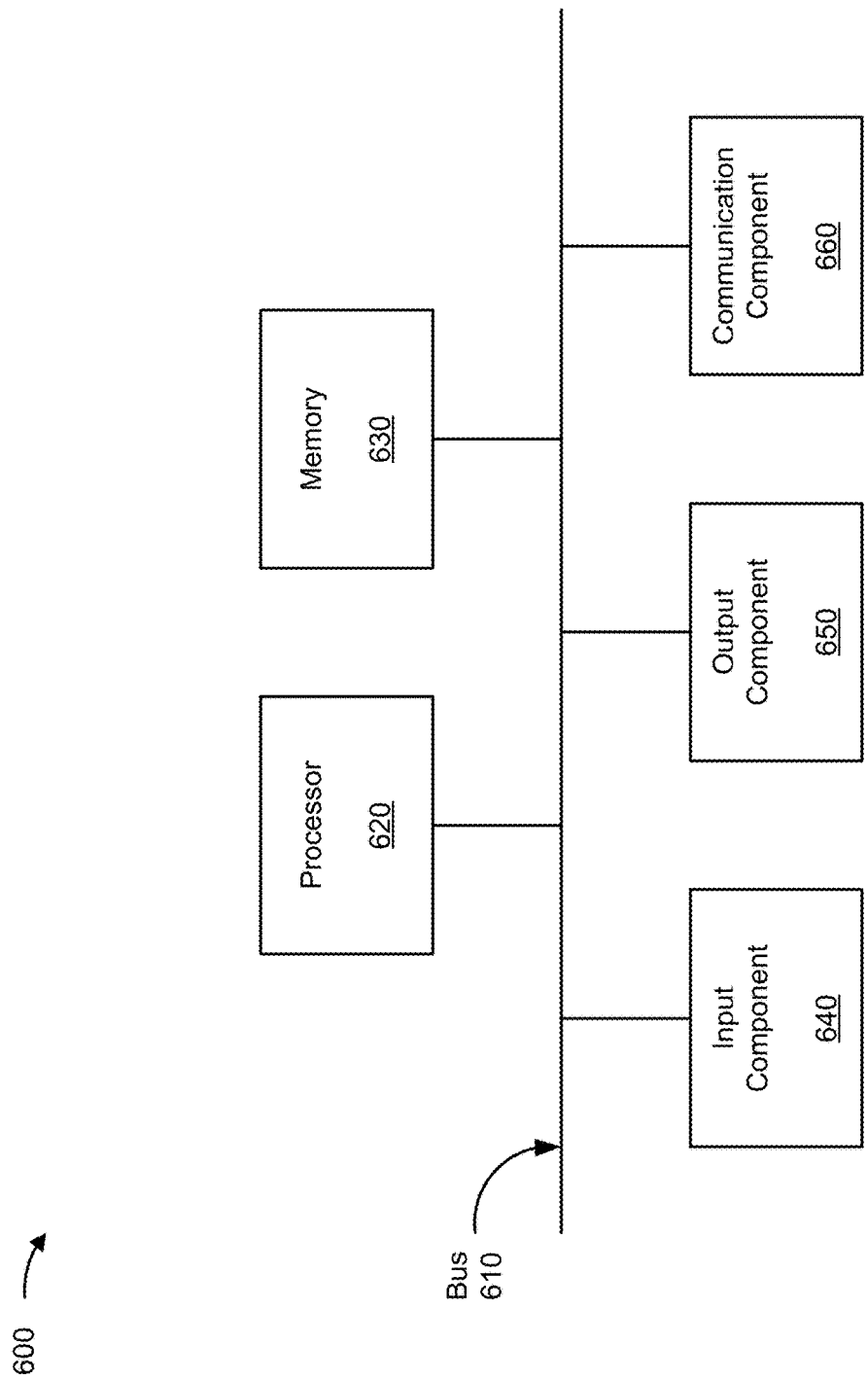
FIG. 6 is a diagram of example components of one or more devices of FIG. 6.

FIG. 6 is a diagram of example components of a device 600, which may correspond to a remote server, a middleman server, and/or a user device. In some implementations, a remote server, a middleman server, and/or a user device may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Additionally, or alternatively, input component 640 may include a camera or another type of optical sensor and/or a fingerprint scanner or another type of biometric sensor. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
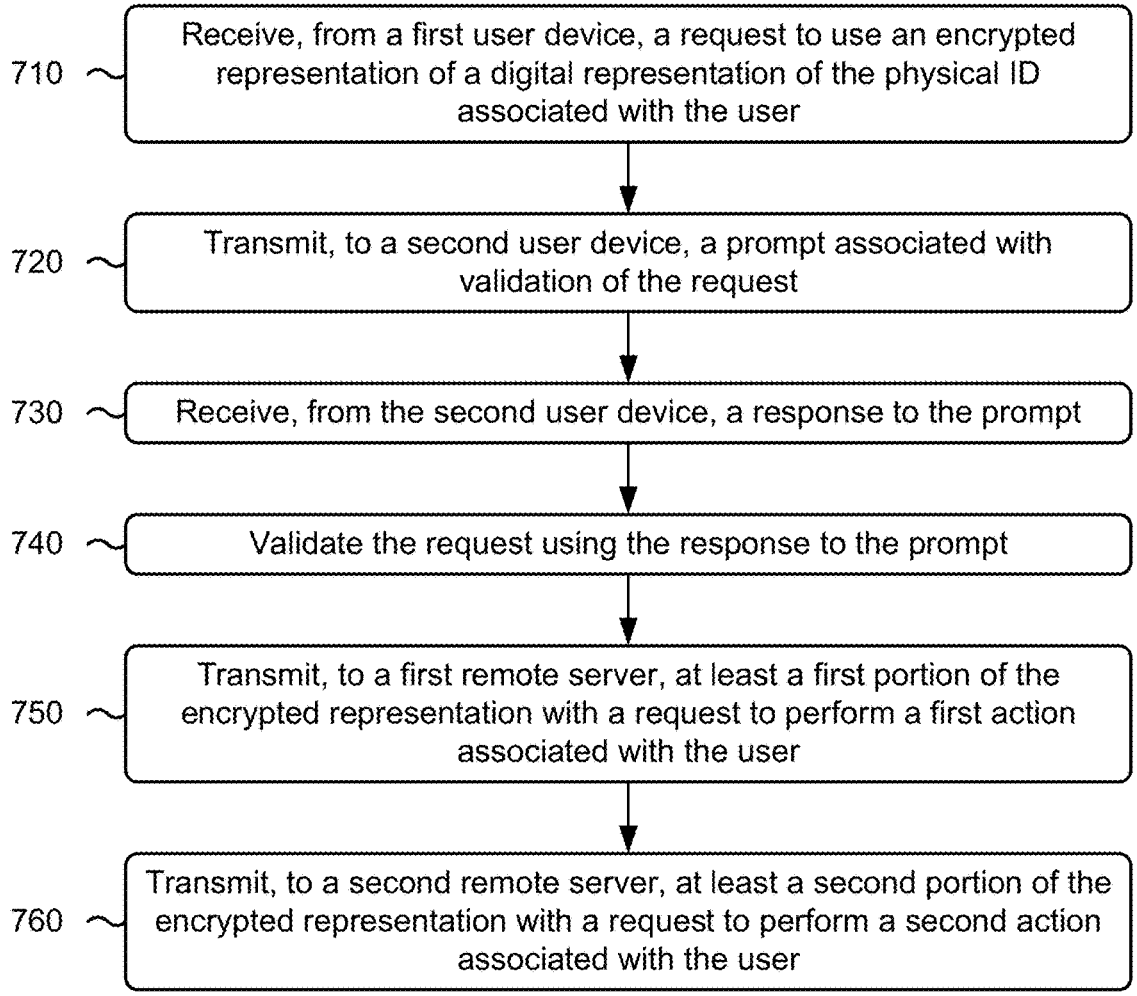
FIG. 7 is a flowchart of an example process relating to verification based on an encrypted representation of a physical identifier.

FIG. 7 is a flowchart of an example process 700 associated with verification based on an encrypted representation of a physical ID associated with a user. In some implementations, one or more process blocks of FIG. 7 may be performed by a device (e.g., remote server 501). In some implementations, one or more process blocks of FIG. 7 may be performed by another device or a group of devices separate from or including the device, such as middleman server 530 and/or user device 540. Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving, from a first user device, a request to use an encrypted representation of a digital representation of the physical ID associated with the user (block 710). For example, the request may include a message and/or another type of data structure associated with use of the physical ID. In one example, the user may navigate to a website, using the first user device, and initiate the request by interacting with the website. In another example, the user may interact with an application, executed on the first user device, to initiate the request.

As further shown in FIG. 7, process 700 may include transmitting, to a second user device, a prompt associated with validation of the request (block 720). For example, the prompt may include a message and/or another type of data structure associated with a verification process for using the physical ID. In some implementations, the prompt includes a prompt for the user to allow a camera, associated with the second user device, to capture an image of the user. Additionally, or alternatively, the prompt may include a prompt for the user to allow an optical sensor, associated with the second user device, to capture a fingerprint, an eye scan, a facial scan, and/or another biometric property associated with the user.

As further shown in FIG. 7, process 700 may include receiving, from the second user device, a response to the prompt (block 730). For example, the response may include an image of the user, a fingerprint associated with the user, and/or another biometric property associated with the user. Additionally, or alternatively, the response may include an indication that the user has approved the request, an indication of a secret code or other alphanumeric sequence (e.g., configured during registration of the second user device, as described in connection with FIG. 2A), and/or an answer to a verification question (e.g., configured during registration of the second user device, as described in connection with FIG. 2A).

As further shown in FIG. 7, process 700 may include validating the request using the response to the prompt (block 740). For example, validation may be performed using information included in the response, as described herein.

Accordingly, as further shown in FIG. 7, process 700 may include transmitting, to a first remote server, at least a first portion of the encrypted representation with a request to perform a first action associated with the user (block 750). For example, the request may include a message and/or another type of data structure associated with the first action. In some implementations, the first remote server is associated with an account of the user, and the first remote server may perform the action as described in connection with FIG. 1D.

Additionally, as further shown in FIG. 7, process 700 may include transmitting, to a second remote server, at least a second portion of the encrypted representation with a request to perform a second action associated with the user (block 760). For example, the request may include a message and/or another type of data structure associated with the second action. In some implementations, the second remote server is associated with an address of the user, and the second remote server may generate a digital and/or physical shipping slip in order to perform the second action.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1D, 2A-2B, and/or 3A-3B.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of verification based on a physical identifier (ID) associated with a user, comprising:
    receiving, from a first user device, a request to use an encrypted representation of a digital representation of the physical ID associated with the user;
    transmitting, to a second user device, a prompt associated with validation of the request;
    receiving, from the second user device, a response to the prompt;
    validating the request using the response to the prompt;
    transmitting, to a first remote server, at least a first portion of the encrypted representation with a request to perform a first action associated with the user; and
    transmitting, to a second remote server, at least a second portion of the encrypted representation with a request to perform a second action associated with the user.

2. The method of claim 1, wherein the first remote server is associated with an account of the user, and the first portion of the encrypted representation is associated with an identifier of the user.

3. The method of claim 1, wherein the second remote server is associated with an address of the user, and the second portion of the encrypted representation is associated with the address of the user.

4. The method of claim 1, wherein the first portion of the encrypted representation is encrypted using a first key, and the second portion of the encrypted representation is encrypted using a second key.

5. The method of claim 1, wherein transmitting the prompt comprises:
    transmitting a push notification to the second user device.

6. The method of claim 1, wherein validating the request comprises:
    receiving a secure message from the second user device that responds to the prompt and validates the request.

7. The method of claim 1, further comprising:
    receiving, from the first user device, a request to register the second user device; and
    receiving, from the second user device, confirmation of the request to register the second user device.

8. A system for verification based on a physical identifier (ID) associated with a user, the system comprising:
    one or more memories; and
    one or more processors, communicatively coupled to the one or more memories, configured to:
    receive, from a first user device, a request to use an encrypted representation of a digital representation of the physical ID associated with the user;
    transmit, to a second user device, a prompt associated with validation of the request;
    receive, from the second user device, a response to the prompt;
    validate the request using the response to the prompt;
    transmit, to a first remote server, at least a first portion of the encrypted representation with a request to perform a first action associated with the user; and
    transmit, to a second remote server, at least a second portion of the encrypted representation with a request to perform a second action associated with the user.

9. The system of claim 8, wherein the first remote server is associated with an account of the user, and the first portion of the encrypted representation is associated with an identifier of the user.

10. The system of claim 8, wherein the second remote server is associated with an address of the user, and the second portion of the encrypted representation is associated with the address of the user.

11. The system of claim 8, wherein the first portion of the encrypted representation is encrypted using a first key, and the second portion of the encrypted representation is encrypted using a second key.

12. The system of claim 8, wherein the one or more processors, to transmit the prompt, are configured to:
    transmit a push notification to the second user device.

13. The system of claim 8, wherein the one or more processors, to validate the request, are configured to:
    receive a secure message from the second user device that responds to the prompt and validates the request.

14. The system of claim 8, wherein the one or more processors are configured to:
    receive, from the first user device, a request to register the second user device; and
    receive, from the second user device, confirmation of the request to register the second user device.

15. A non-transitory computer-readable medium storing a set of instructions for verification based on a physical identifier (ID) associated with a user, the set of instructions comprising:

one or more instructions that, when executed by one or more processors of a device, cause the device to:
receive, from a first user device, a request to use an encrypted representation of a digital representation of the physical ID associated with the user;
transmit, to a second user device, a prompt associated with validation of the request;
receive, from the second user device, a response to the prompt;
validate the request using the response to the prompt;
transmit, to a first remote server, at least a first portion of the encrypted representation with a request to perform a first action associated with the user; and
transmit, to a second remote server, at least a second portion of the encrypted representation with a request to perform a second action associated with the user.

16. The non-transitory computer-readable medium of claim 15, wherein the first remote server is associated with an account of the user, and the first portion of the encrypted representation is associated with an identifier of the user.

17. The non-transitory computer-readable medium of claim 15, wherein the second remote server is associated with an address of the user, and the second portion of the encrypted representation is associated with the address of the user.

18. The non-transitory computer-readable medium of claim 15, wherein the first portion of the encrypted representation is encrypted using a first key, and the second portion of the encrypted representation is encrypted using a second key.

19. The non-transitory computer-readable medium of claim 15, wherein the one or more instructions, that cause the device to transmit the prompt, further cause the device to:
transmit a push notification to the second user device.

20. The non-transitory computer-readable medium of claim 15, wherein the one or more instructions, that cause the device to validate the request, further cause the device to:
receive a secure message from the second user device that responds to the prompt and validates the request.

* * * * *